Feb. 20, 1973 ITSUO HANDA 3,717,406
MEASURING APPARATUS FOR EIGHT MILLIMETER FILM EDITING MACHINE
Filed March 13, 1969
4 Sheets-Sheet 1
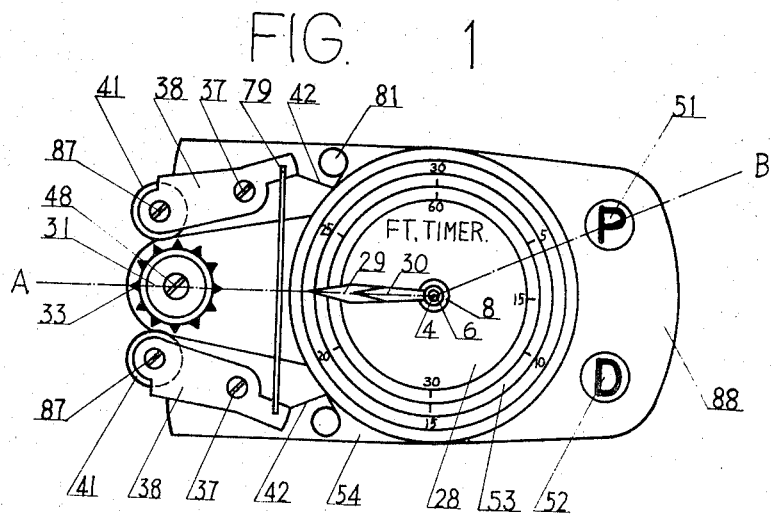
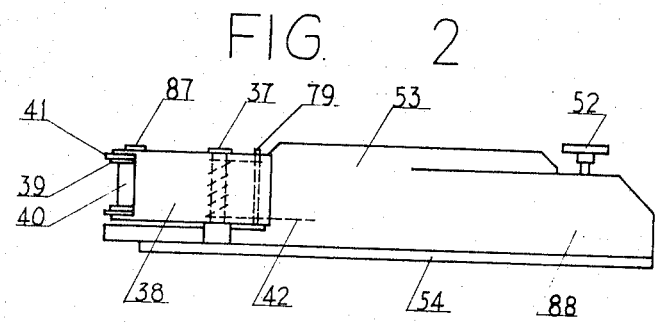
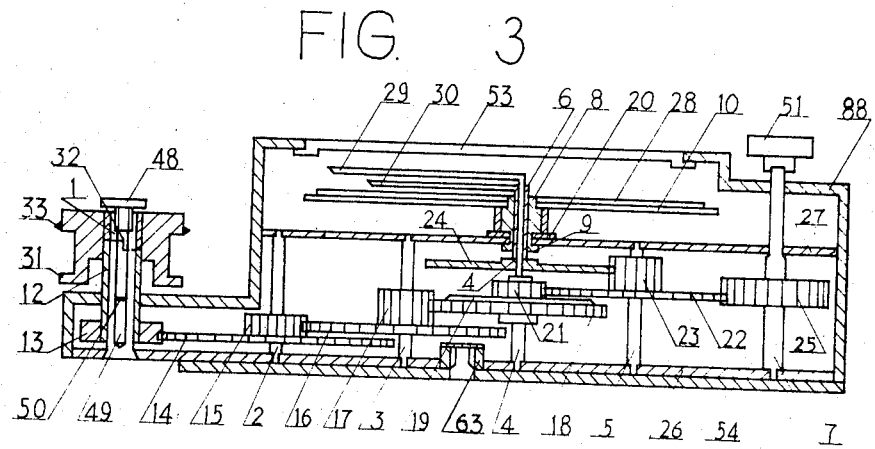
Itsuo Handa
INVENTOR

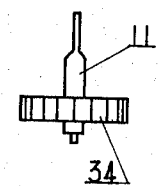
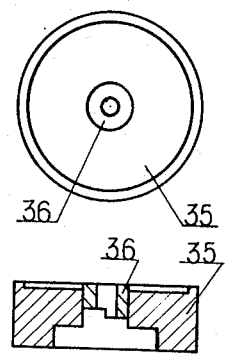
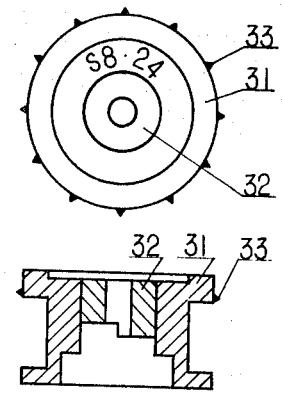
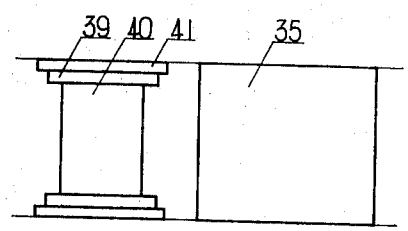
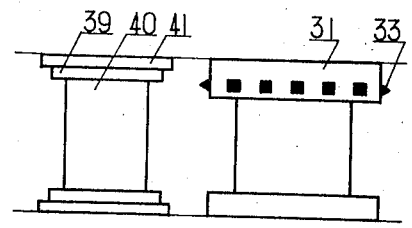
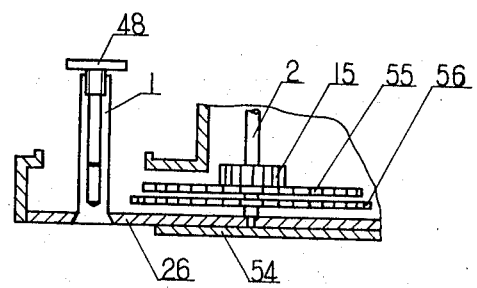

FIG 10
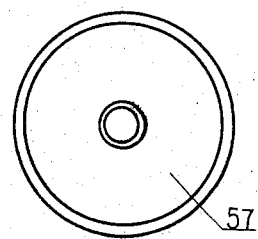
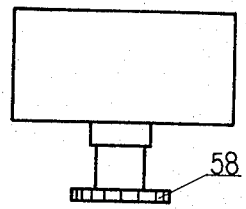
FIG 11
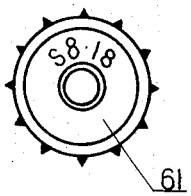
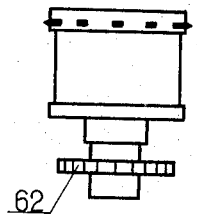
FIG 12
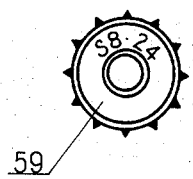
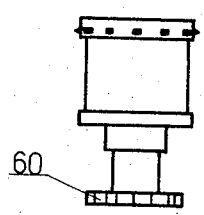
FIG 13
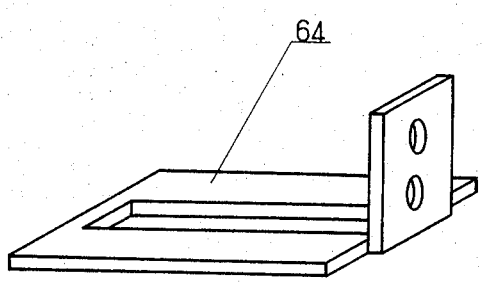
FIG 14
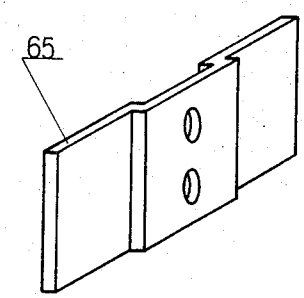
FIG 15
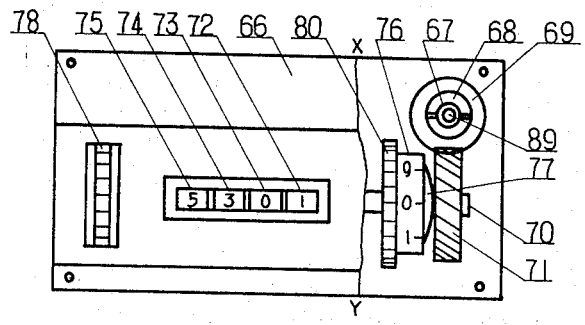
Itsuo Handa
INVENTOR Feb. 20, 1973   ITSUO HANDA   3,717,406
MEASURING APPARATUS FOR EIGHT MILLIMETER FILM EDITING MACHINE
Filed March 13, 1969

Itsuo Handa
INVENTOR ně# United States Patent Office 3,717,406
Patented Feb. 20, 1973

3,717,406
MEASURING APPARATUS FOR EIGHT MILLI-METER FILM EDITING MACHINE
Itsuo Handa, 47 Higashigoto-cho, Kamigamo, Kyoto, Japan
Filed Mar. 13, 1969, Ser. No. 806,867
Int. Cl. G03b 1/60
U.S. Cl. 352—172                     3 Claims

ABSTRACT OF THE DISCLOSURE

A device which measures length of film or recorder tape calibrated in terms of time necessary for the tape or film to move past the measuring point. Included is a shaft to which various size sprockets having different sizes and numbers of teeth to correspond to different film speed may be journaled. Rollers of different diameters for different tape speeds may also be journaled to the shaft. Reduction gears make a minute and second hand rotate in proportion to the time necessary for the winding or reeling to proceed for a given length of film or tape at a given film or tape speed. A knob and gearing is provided to rotate the dial of the minute and second hand to a convenient orientation.

---

Figure 16:
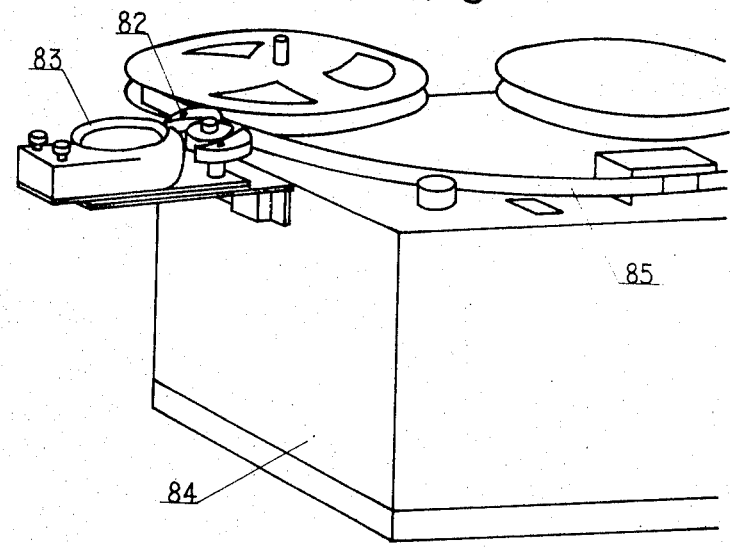

This invention relates to measuring apparatus for the 8 mm. film editing machine. In the editing machine of the type here being considered, the film is manually wound on the winding reel on the right side from the supplying reel located on the left side, and the reverse rotation is also possible. The picture is produced on the screen of the editing machine.

This invention is concerned with the provision of a measuring apparatus for the 8 mm. film editing machine. This measuring apparatus is located in the path of the film moving from one reel to another reel. The teeth of the sprocket of this measuring apparatus are in engagement with perforations of the film. This sprocket is rotated by the film. The socket drives the reduction gears and these reduction gears drive the indicating pointers.

There are two types of 8 mm. film, one of which called single eight and which is made specifically for the 8 mm. moving picture camera, and the other called double eight, which is 16 mm. film for a 16 mm. moving picture camera cut into halves lengthwise.

The film of projector is generally driven per second 24 or 18 frames in case of single eight, and in case of double eight, 24 or 16 frames.

The frame length of single eight film is 4.23 mm. and the frame length of double eight film is 3.81 mm. Therefore the single eight film advances 101.52 mm. (4.23 x 24) or 76.14 mm. (4.23 x 18) per second, and double eight film advances at a rate of 91.44 mm. (3.81 x 24) or 60.96 mm. (3.81 x 16) per second.

Therefore by reading the motion of indicating pointers, the particular section of the film or the time needed for projection can be obtained directly, and indirectly the length of the film. When the film is being wound on the supplying reel, the indicating pointers make reverse rotation.

It is a matter of fact that a different sprocket must be used according to the kind of film and its speed.

The width of the said film is 8 mm. and the width of an ordinary tape for tape recorder is 6.35 mm. Therefore the guide roller of this apparatus can be used as guide roller for the recorder tape.

The tape of the tape recorder can be generally wound 9.5 cm. per second or 19 cm. from the supplying reel on the left side to the winding reel on the right side.

When the said sprocket is replaced by measuring roller and this measuring apparatus is attached to the tape recorder the measuring roller is rotated by the running tape. Therefore by reading the movement of indicating means, the particular section of the tape or the time needed for recording or reproducing is obtained directly, and indirectly the length of the tape.

At present the 8 mm. projector is used generally together with the tape recorder. Therefore if the time needed for projecting the film is known beforehand, it makes it easy to record the explanation of the film, and background music for the same duration of time. Such being the case, this invention is the most convenient thing for 8 mm. film lovers.

The object of this invention is to provide a machine which can obtain the particular section of the film or the time needed for projecting the film directly and indirectly the length of the film.

Another object of this invention is to provide a machine that can be used for a measuring apparatus for tape recorder by replacing the sprocket with a measuring roller.

Figure 17:
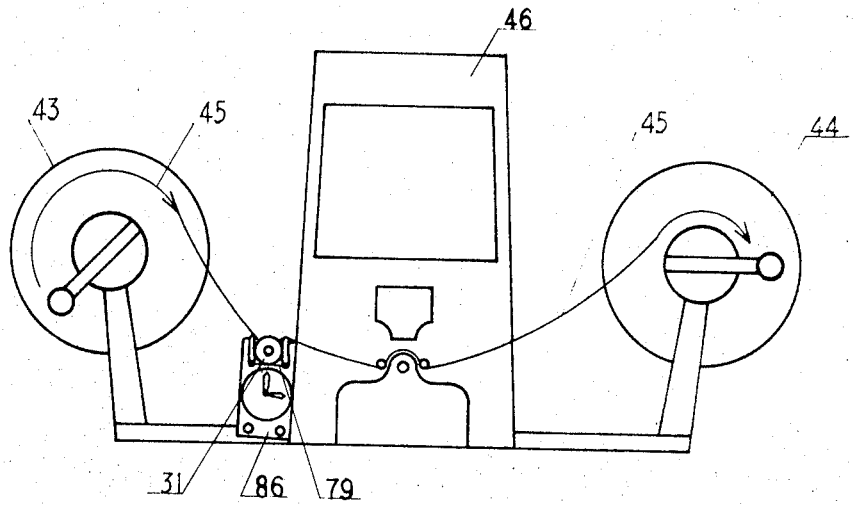

The apparatus of the present invention will be explained in conjunction with the attached drawings in which:

FIG. 1 is a plane view of this apparatus;
FIG. 2 is a side view of this apparatus;
FIG. 3 shows a longitudinal section of FIG. 1 on the line A–B;
FIG. 4 shows a side view of the gear that drives the dial;
FIG. 5 shows a plane view of measuring roller and its longitudinal section;
FIG. 6 shows a plane view of sprocket and its longitudinal section;
FIG. 7 shows a side view showing the relation of the height of the guide roller to that of the measuring roller;
FIG. 8 shows a side view showing the relation of the height of the guide roller to that of the sprocket;
FIG. 9 shows a side view of mechanism that changes the reduction gear ratio;
FIG. 10 shows plane and side views of small measuring roller fixed on the hollow shaft of the gear;
FIG. 11 shows plane and side views of the sprocket for single eight having 9 teeth fixed on the hollow shaft of the gear;
FIG. 12 shows plane and side views of the sprocket for single eight having 8 teeth fixed on the hollow shaft of the gear;
FIG. 13 shows an example of a supporting implement of this apparatus;
FIG. 14 shows an example of an implement for fixing the supporting implement shown in FIG. 13 to an 8 mm. film editing machine and the tape recorder;
FIG. 15 shows a plane view of another example, excepting the portion connected with the guide roller, of this invention whose cover is cut on the line X—X;
FIG. 16 shows a view of this invention attached to the tape recorder;
FIG. 17 shows a view of this invention attached to the 8 mm. film editing machine.

As shown in FIG. 17, 8 mm. film 45 wound on a supplying reel 43 of the 8 mm. film editing machine 46, is wound manually on a winding reel 44 passing through a guide roller 39, shown in FIGS. 2, 5 and 7, a sprocket 31 shown in FIGS. 1, 3 and 6, and another guide roller 39. The perforations of the said film are in engagement with teeth 33 of the said sprocket. Therefore the sprocket rotates.

As shown in FIG. 3, a shaft 32 of the sprocket 31 having twelve teeth 33 is clutched with a hollow shaft 12 which is loosely mounted on a shaft 1. The shaft 1 is secured to a plate 26. A gear 13 of small diameter secured to the hollow shaft 12 is in engagement with a gear 14 of large diameter secured to a shaft 2.

When the shaft 12 makes 2 rotations, the shaft 2 makes 1 rotation. A gear 15 of small diameter secured to the gear 14 is in engagement with a gear 16 of large diameter secured to a shaft 3. A gear 17 of small diameter fixed to the gear 16 is in engagement with a gear 18 of large diameter fixed to a shaft 4 by means of a friction spring 19. A second hand 29 is fixed to the shaft 4.

When the sprocket 31 makes 60 rotations, the shaft 4 makes 1 rotation. A gear 21 of small diameter secured to the shaft 4 is in engagement with a gear 22 of large diameter secured to a shaft 5. A gear 23 of small diameter secured to the gear 22 is in engagement with a gear 24 of large diameter secured to a hollow shaft 6 which is loosely mounted on the shaft 4. A minute hand 30 is fixed to the shaft 6.

When the shaft 4 makes 60 rotations, the shaft 6 makes 1 rotation. Therefore the length of a film that makes one rotation of the second hand 29 is 12 (frames) ×60 (rotations)=720 (frames). It is clear that 720 (frames)÷24 (frames)=30. Therefore it takes 30 seconds for the film of the same length to be screened. It takes 30 minutes to screen the length of film which takes 1 rotation for the minute hand 30.

In editing the single eight which advances 18 frames per second, remove a screw 48 shown in FIGS. 1 and 3, from the shaft 1 and replace the sprocket 31 with the sprocket having 9 teeth.

In case of double 8, the sprocket 31 must be replaced by an apropriate sprocket for double 8 mm. film having either 8 or 12 teeth.

As shown in FIG. 3, a gear 25 of small diameter secured to a shaft 7 is in engagement with the gear 22. Stem 51 shown in FIGS. 1 and 3 is fixed to the shaft 7. Therefore by moving the stem 51, the indicating hands can be set at any desired position.

When the sprocket makes reverse rotation, the indicating hands makes reverse rotation.

As shown in FIG. 3, a bushing 8 having flange 9 is securely inserted into a hole of a plate 27. A ring pin 20 is fixed to the bushing 8. A gear 10 of large diameter is secured to the front end of the bushing 8. A dial 28 is fixed to the gear 10. As shown in FIG. 4, the gear 34 of small diameter secured to a shaft 11. The stem 52 shown in FIGS. 1 and 2 is fixed to the shaft 11. The gear 34 is in engagement with the gear 10. Therefore by moving the stem 52, the dial 28 can be rotated to any direction. Therefore it is easy to read the dial and convenient to attach the device to any type of editing machine or tape recorder.

When the sprocket is replaced with the measuring roller 35 shown in FIG. 5 whose circumference is 9.5 cm., a shaft 36 clutches with the hollow shaft 12. Therefore when the measuring roller 35 makes 60 rotations by a tape 85 of a tape recorder 84 which advances 9.5 cm. per second, the second hand 29 makes one rotation, and when the second hand 29 makes 60 rotations, the minute hand 30 makes one rotation.

Therefore it is clear that it takes 60 seconds to reproduce the tape whose length took the second hand 29 one rotation.

Therefore by reading the movement of indicating hands the particular section of the tape, the time needed for recording and/or reproducing can be obtained directly and indirectly in length of the tape.

Therefore the explanation of the film, and the background music can be made easily and correctly by means of the tape recorder.

When an appropriate stroboscope is attached to the measuring roller, it is convenient to adjust the speed of the film to the speed of the tape.

In FIG. 9, gears 55 and 56 are secured to the shaft 2. In FIG. 10, gear 58 is secured to a hollow shaft of the measuring roller 57. The circumference of the measuring roller 57 is ⅔ of that of the measuring roller 35. In FIG. 12 gear 60 is secured to a hollow shaft of the sprocket 59 having 8 teeth for single 8 film. The number of the teeth of gear 56 is three times as many as those of gears 58 and 60.

When the measuring roller 57 or sprocket 59 are inserted in the shaft 1, the gear 58 or the gear 60 are engaged with gear 56. Therefore if the measuring roller 57 or the sprocket 59 rotate three times, the shaft 2 rotates once. In FIG. 11 a gear 62 is fixed to a hollow shaft of a sprocket 61 having 9 teeth for single 8 film. The number of the teeth of the gear 55 is twice as many as that of the gear 62. The gear 62 is in engagement with the gear 55 when the sprocket 61 is inserted in the shaft 1. Therefore when the sprocket 61 makes two rotations the shaft 2 rotates once.

Therefore apparatus can be made smaller:

In case of single 8 only, the gear 55 is not needed. When the film advances 18 frames per second, the sprocket having 8 teeth must be provided.

As shown in FIGS. 1 and 2, the guide roller 39 is mounted on the shaft 87 secured to a lever 38, the lever 38 is mounted on a shaft 37 secured to a plate 54.

Numeral 41 in FIGS. 1, 2, 7 and 8 shows the flange of the guide roller 39. Numeral 40 is a gap for preventing the film from being harmed. The tape or film passes along this gap. But when the width of the gap 40 is made wider than that of the tape, the gap 40 acts as guide roller of the tape. The tip of a U-shaped implement 79 shown in FIGS. 1, 2 and 17 is engaged with the hole of plate 54 through the hole 82 of lever 38 shown in FIG. 16. Therefore the guide roller does not move. It is inconvenient to engage the film with the sprocket with one hand. But if this inconvenience is not minded, the implement 79 is not needed. When the implement 79 is removed the guide roller 39 is urged to press the measuring roller by means of spring 42 shown in FIGS. 1 and 2. Therefore the movement of the tape can be conveyed correctly to the measuring roller.

Numeral 49 shown in FIG. 3 is an oil container. Numeral 50 is outlet of the oil. Numeral 53 shown in FIGS. 1, 2 and 3 is a glass covering the dial. Numeral 81 shown in FIG. 1 is a hole for attaching this apparatus to the editing machine or the tape recorder. A nut 63 is affixed to the plate 54 as shown in FIG. 3. This nut 63 is for fixing this apparatus to a supporting implement 64 shown in FIG. 13. Numeral 83 shown in FIG. 16 shows this invention attached to the tape recorder 84. Numeral 86 shown in FIG. 17 is this invention attached to the 8 mm. film editing machine. Numeral 88 shown in FIGS. 1, 2 and 3 is a case of this apparatus. An implement 65 shown in FIG. 14 is the implement to be attached to the film editing machine and the tape recorder, and the supporting implement 64 is attached to the implement 65 by means of screws.

In FIG. 15, a shaft 67 is secured to a frame 66, a hollow shaft 68 is loosely mounted on the shaft 67. A worm gear 69 is secured to the shaft 68, The worm gear is in engagement with a worm wheel 71 secured to a counter shaft 70.

Therefore as mentioned above, sprocket with appropriate number of teeth or appropriate size of measuring roller are inserted in the shaft 67. Therefore the rotation of sprocket or measuring roller is transmitted to the shaft 70. When the shaft 70 makes 10 rotations, a counter wheel 72 makes one rotation. This one rotation means 10 seconds. When the counter wheel 72 makes 6 rotations, a counter wheel 73 makes one rotation. One rotation of the counter wheel 73 means 1 minute. When the counter wheel 73 makes 10 rotations, a counter wheel 74 makes one rotation. One rotation of the counter wheel 74 means 10 minutes. When the counter wheel 74 makes 6 rotations a counter wheel 75 makes one rotation, which means one hour. A counter wheel 76 is fixed to the shaft 70 by means of a friction spring 77. Counter wheels 72, 73, 74 and 75 advance intermittently.

When a stem 78 is rotated, counter wheels 72, 73, 74 and 75 return to zero position. When a stem 80 is rotated, the counter wheel 76 can be moved to any desired position. One rotation of this counter wheel means 1 second.

This invention shown in FIG. 15 can be conveniently inserted in 8 mm. film editing machine. In this case, the guide roller of 8 mm. editing machine can be also used for the guide roller of this apparatus. In this invention it is easy to fix the sprocket or the measuring roller to the shaft 70, and it can be so constructed as to transmit the motion of the sprocket or the measuring roller to the counter shaft 70 by means of a belt.

The reduction gear ratio or the size of the sprocket or the measuring roller is not necessarily limited as above mentioned.

In this invention the shaft 1 shown in FIG. 3 and the shaft 67 shown in the FIG. 15 can be so constructed as rotatably supported. In this case, the sprocket or the measuring roller can be movably supported by the shafts 1 and 67. In this invention when the hollow shafts 12 and 67 are made longer, the sprocket and measuring roller can be so constructed as removably supported directly on the shafts 1 and 67.

I claim:

1. The combination of an 8 millimeter film editing machine, having means for manually transporting film with measuring apparatus, comprising a sprocket adapted to engage the said film, means to hold said film in firm engagement with the sprocket, a shaft removably supporting said sprocket, indicating pointers, a dial, said pointers juxtaposed to said dial, means for manually adjusting said dial, a reduction gear train coupling said shaft with said indicating pointers, and means associated with said indicating pointers for manually adjusting the pointers whereby said indicating pointers denote on the dial the movements of said film.

2. In an editing machine for 8 millimeter film, a measuring apparatus for indicating on a dial the time that would be required for screening the said film, comprising a sprocket adapted to engage the said film, means to hold said film in firm engagement with a sprocket, a gear train driven by said sprocket, pointers indicating on said dial the revolutions of said sprocket in time, means for manually adjusting the dial, and means for manually adjusting the said pointers, whereby the time for screening can be obtained to the second.

3. Apparatus comprising a sprocket which is located on the path of an advancing 8 mm. movie film, means to place said film in tension and to hold said film in firm engagement with a sprocket, a shaft removably supporting said sprocket, indicating pointers, a dial, said pointers juxtaposed to said dial, means for manually adjusting said dial, a reduction gear train coupling said shaft and said indicating pointers, and means associated with said indicating pointers for manually adjusting the said pointers whereby said indicating pointers denote the movement of said film.

References Cited

UNITED STATES PATENTS

| | | | |
|---|---|---|---|
| 1,489,106 | 4/1924 | Avers | 352—129 |
| 1,989,971 | 2/1935 | Cretin | 352—172 |

FOREIGN PATENTS

| | | | |
|---|---|---|---|
| 346,051 | 2/1921 | Germany | 352—172 |

LOUIS R. PRINCE, Primary Examiner

D. E. CORR, Assistant Examiner